Patented Apr. 1, 1952

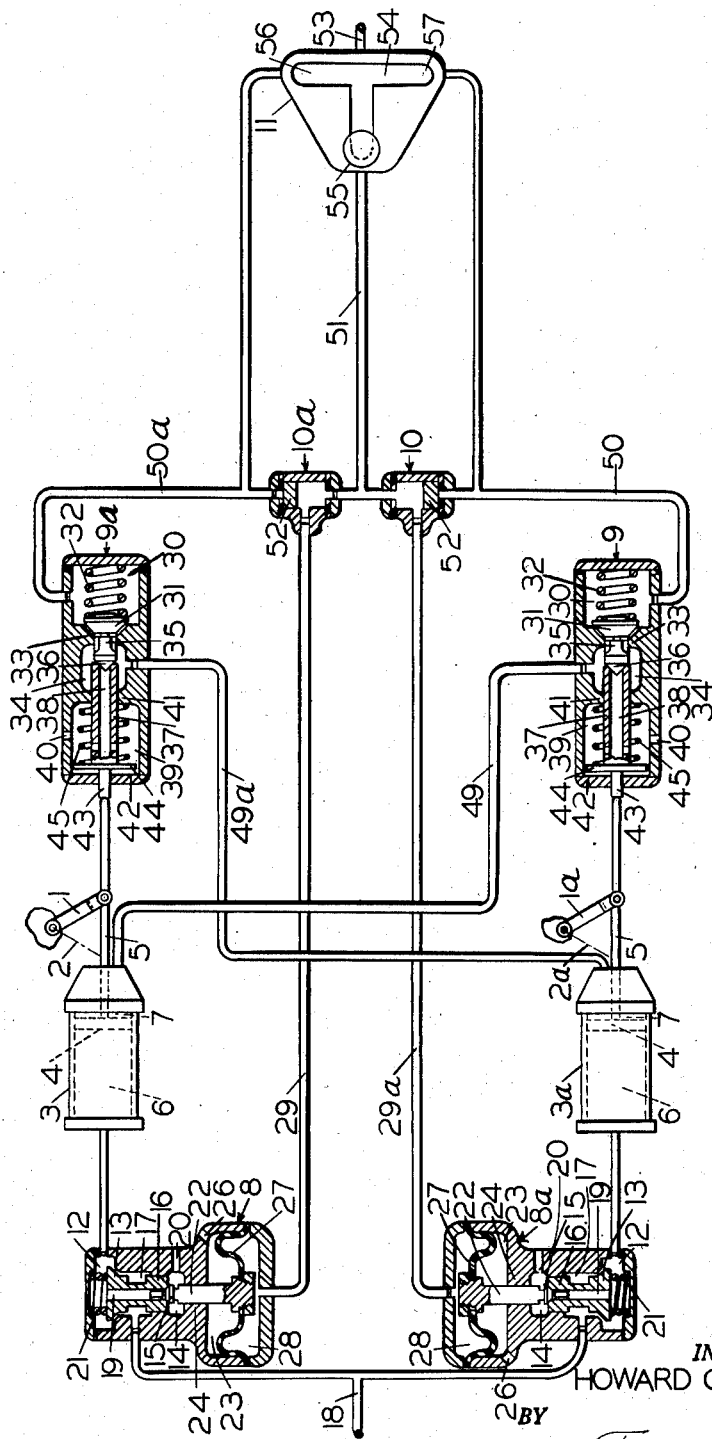

2,591,201

UNITED STATES PATENT OFFICE 2,591,201

CLUTCH CONTROL APPARATUS

Howard C. Rowand, Wanakena, N. Y., assignor to Westinghouse Air Brake Company, a corporation of Pennsylvania Application February 12, 1949, Serial No. 76,058

6 Claims. (Cl. 60—97)

This invention relates to clutch control apparatus and more particularly to apparatus for selectively controlling a plurality of clutch means.

In hoisting apparatus means including releasable couplings or clutches are usually provided for varying the speed ratio between the drive engine and the hoisting drum for correspondingly varying the amount of power applied to the drum or the hoisting speed of the drum. For instance, there may be a high speed clutch and a low speed clutch either one of which may be employed for driving the hoisting drum and it is desirable that before either one is engaged that the other be disengaged.

The principal object of the invention is therefore the provision of improved apparatus for selectively controlling a plurality of clutches or the like and embodying means for positively preventing either clutch becoming effective to drive a drum or the like while another is effective to drive said drum.

Other objects and advantages will become apparent from the following more detailed description of the invention.

In the accompanying drawing, the single figure is a diagrammatic view of a clutch control apparatus embodying the invention.

Description

As shown in the drawing, the reference numerals 1, 1a designate two movable coupling or clutch control elements or levers for, respectively, two separate coupling means (not shown), each of said levers having two different positions, namely, the position in which it is shown in the drawing for rendering the respective clutch ineffective, that is, a clutch disengaged position, and a second position indicated by a line designated by a numeral 2 or 2a for rendering the clutch effective, that is a clutch engaged position.

Two pneumatic, double acting motors 3, 3a are provided for controlling the positioning of the clutch control levers 1, 1a, respectively. Each of the motors 3, 3a comprises a casing containing a piston 4 from one side of which projects a piston rod 5 which is connected to the respective clutch control lever 1, 1a. At one side of piston 4 is a pressure chamber 6 and at the opposite side a pressure chamber 7. When fluid under pressure is supplied to chamber 6 at a time when chamber 7 is vented, as will be hereinafter described, the piston 4 will be moved to the position in which it is shown in the drawing for moving the respective clutch control lever 1 or 1a to its clutch disengaged position. When fluid under pressure is supplied to chamber 7 at a time when chamber 6 is vented, the piston 4 will be operated to turn the respective lever 1 or 1a to its clutch engaged position designated by reference numeral 2 or 2a.

For controlling operation of the motors 3, 3a there are provided, respectively, two fluid pressure relay valve devices 8, 8a, two interlock valve devices 9, 9a, two double check valve devices 10, 10a and an operator's control valve device 11.

The two relay valve devices 8, 8a are of identical construction, each comprising a casing having a chamber 12 containing a fluid pressure supply valve 13 and a chamber 14 containing a fluid pressure release valve 15. The supply valve 13 is formed on one end of a stem 16 which is slidably mounted in the casing. Adjacent the valve 13 the stem 16 has an annular cavity 17 which is open to a fluid pressure supply pipe 18, said valve being arranged to cooperate with a seat on the casing for controlling communication between said pipe and said chamber. An axial bore 19 extending through the valve 13 and stem 16 is open at one end to chamber 12 and at the opposite end to chamber 14 through a valve seat provided on said plunger for cooperation with the release valve 15. Chamber 14 is open to atmosphere through a passage 20. A spring 21 in chamber 12 acts on the supply valve 13 for urging it to its seat. The release valve 15 is engaged by a stem 22 extending from chamber 14 into a chamber 23 through a separating partition wall 24, the latter chamber being also open to atmosphere through a passage 26. The end of stem 22 opposite that engaging the release valve 15 is connected to the central portion of a flexible diaphragm 27 which is subject on one side to atmospheric pressure in chamber 23, while at the opposite side of said diaphragm there is a pressure control chamber 28.

In the relay valve devices 8, 8a, the supply valve chambers 12 are open to chambers 6 in the motors 3, 3a, respectively, while the pressure chambers 28 are open respectively to control pipes 29, 29a. When fluid under pressure is supplied to either pipe 29 or 29a, and thereby the pressure chamber 28 in the relay valve device 8 or 8a, in a manner which will be later described, the diaphragm 27 in said relay valve device will be deflected to seat the release valve 15 against the stem 16 and then operate said stem to unseat the supply valve 13 for permitting fluid under pressure to flow from the supply pipe 18 to pressure chamber 6 in the respective motor 3 or 3a. Upon release of fluid under pressure from pipe 29 or 29a, fluid under pressure will be released from diaphragm chamber 28 in the respective relay valve device 8 or 8a to permit spring 21 to seat the fluid pressure supply valve 13 and to permit pressure of fluid from chamber 12 acting on the release valve 15 to unseat same for thereby cutting off supply of fluid under pressure to and for releasing the fluid under pressure from pressure chamber 6 in the respective motor 3, 3a.

The two interlock valve devices 9, 9a are of identical structure each comprising a casing having a chamber 30 containing a fluid pressure supply control valve 31 and a spring 32 for urging said valve to a seat against a partition wall 33 separating said chamber from a chamber 34. The supply control valve 31 has a fluted stem 35 projecting therefrom through the partition wall 33 into chamber 34 past which stem communication is adapted to be established between said chamber and chamber 30 when said valve is unseated. On the end of valve stem 35 in chamber 34 there is provided a fluid pressure release valve 36 arranged to cooperate with a seat provided on one end of a coaxially arranged plunger 37 for controlling communication between said chamber and an axial bore 38 in said plunger which is open to a chamber 39 in the casing. The chamber 39 is open to atmosphere through a casing passage 40 and is separated from chamber 34 by a partition wall 41 through which the plunger 37 extends in sliding and sealing contact therewith.

The end of chamber 39 opposite partition wall 41 is closed by a cap 42 and slidably mounted in this cap is a pin 43 arranged in coaxial relation to the plunger 37 and provided in chamber 39 with a head 44 connected to the adjacent end of said plunger. A coil spring 45 encircling plunger 37 within chamber 39 is supported at one end on the partition wall 41 while its opposite end bears against the head 44 for actuating said head to pull plunger 37 out of seating engagement with the release valve 36.

The interlock valve device 9 is arranged with the axes of its valve 31, plunger 37 and pin 43 in coaxial relation to the end of the piston rod 5 of motor 3a in such a manner that as the piston 4 of motor 3a moves the clutch control lever 1a into its clutch disengaged position, in which it is shown in the drawing, the end of piston rod 5 acting through the respective pin 43, plunger 37 and the release valve 39 will unseat the supply valve 31, it being noted that such movement of said plunger will first seat the release valve and is opposed first by spring 45 and then spring 32. In other words, the supply valve 31 of the interlock valve device 9 will open only when the clutch control lever 1a is substantially in its disengaged position rendering the respective clutch ineffective. Upon movement of piston 4 of motor 3a in the opposite direction the spring 32 will seat valve 31 as the clutch control lever 1a moves out of its clutch disengaged position followed by opening of the release valve 36 and finally movement of the piston rod 5 out of contact with pin 43.

The interlock valve device 9a is similarly arranged with respect to the motor 3 and its operation is also the same with respect to said motor.

The release valve chamber 34 in the interlock valve device 9 is connected by a pipe 49 to pressure chamber 7 in motor 3 which chamber 34 in the interlock valve device 9a is connected to pressure chamber 7 in motor 3a by a pipe 49a. Chambers 30 in the interlock valve devices 9, 9a are connected by pipes 50, 50a to one end of the double check valve devices 10, 10a, respectively. The opposite ends of the double check valve devices 10, 10a are connected together by a pipe 51, while pipes 29a and 29 are connected respectively to side outlets of said double check valve devices.

The double check valve devices 10, 10a are structurally alike, each comprising a double check valve 52 arranged to be operated by fluid under pressure supplied to act on either end to open communication between that end and the side outlet of the device and to close communication between the opposite end and said side outlet.

The pipes 50, 50a and 51 are all connected to the operator's control valve device 11 as is also a fluid pressure supply pipe 53. This device may be generally similar to the type disclosed in United States Patent 2,329,742 issued to R. J. Bush et al., on September 21, 1943 and to which reference may be had for a detailed description of its structure and operation which are not considered essential in the present application. Briefly, the operator's control device 11 comprises a casing having a T-shaped slot 54 through which extends an operating lever 55 for movement by an operator. The control device further comprises valve means (not shown) operable in response to movement of said lever to the position in slot 54 in which it is shown in the drawing to open both pipes 50, 50a to atmosphere while opening pipe 51 to the fluid pressure supply pipe 53. Upon movement of lever 55 to the end of slot 54 designated by numeral 56 the valve means is adapted to operate to open both pipes 50 and 51 to atmosphere while opening pipe 50a to the fluid pressure supply pipe 53, while upon movement of said lever to the end of slot 54 designated by numeral 57 the valve means is adapted to be operated to open pipes 50a, 51 to atmosphere while opening pipe 50 to the fluid pressure supply pipe 53.

*Operation*

In operation, let it be assumed that both fluid pressure supply pipes 18 and 53 are supplied with fluid under pressure and the operator's control lever 55 is in the position in which it is shown in the drawing opening pipes 50, 50a to atmosphere and permitting supply of fluid under pressure from pipe 53 to pipe 51. With pipes 50, 50a open to atmosphere the opposite ends of the double check valves 52 and chambers 30 in the interlock valve devices 9, 9a will also be open to atmosphere by way of said pipes. The fluid under pressure supplied to pipe 51 will therefore urge both double check valves 52 to the position in which they are shown in the drawing whereupon fluid under pressure from pipe 51 will flow to pipes 29, 29a and thence to chambers 28 in the relay valve devices 8, 8a for causing operation of said devices to supply fluid under pressure from pipe 18 to the pressure chamber 6 in the motors 3, 3a. With chambers 6 thus supplied with fluid under pressure, and with chambers 7 vented, as will be presently described, the pistons 7 will assume the positions in which they are shown in the drawing for holding the clutch control levers 1, 1a in their clutch disengaged positions in which the release valves 36 are closed and the supply control valves 31 are open in both of the interlock valve devices 9, 9a. With the supply control valves 31 open in the interlock valve devices 9, 9a, pressure chambers 7 in the motors 3, 3a will be open to chambers 30 and thence to atmosphere through the vented pipes 50, 50a, respectively.

Now let it be assumed that the operator desires to move the clutch control lever 1a to its clutch engaged position while allowing the clutch control lever 1 to remain in its clutch disengaged position. To accomplish this he will move lever 55 to the end 56 of slot 54 for supplying fluid under pressure to pipe 50a while opening pipe 51 to atmosphere along with maintaining pipe 50 open to atmosphere.

Upon opening pipe 51 to atmosphere fluid under pressure will be released from the adjacent ends of the double check valves 52 and thereby from pipes 29, 29a and diaphragm chambers 28 of the relay valve devices 8, 8a. At the same time as fluid under pressure is thus being released from the one face of double check valve 52 in the double check valve device 10a fluid under pressure will be supplied however to the opposite face through pipe 50a, and as soon as the pressure of fluid in pipe 51 becomes reduced to a lower degree than that in pipe 50a said double check valve will shift to its lower position for connecting pipe 50a to pipe 29 and thereby to diaphragm chamber 28 in the relay valve device 8. Thus while there will be a momentary reduction in pressure in chamber 28 of the relay valve device 8 in the operation under consideration, the pressure will be promptly restored so that the parts of said relay valve device will remain in the position shown in the drawing for maintaining the respective motor piston 4 and clutch control lever 1 in the clutch disengaged position and, as a result, the release valve 36 closed and the supply control valve 31 open in the interlock valve device 9a.

Contrary to operation of the relay valve device 8, the fluid under pressure in diaphragm chamber 28 of the relay valve device 8a will be completely vented via pipes 29a and 51 since pipe 50 connected to the opposite end of the respective double check valve 52 is open to atmosphere at this time. As a result, the relay valve device 8a will operate to open chamber 6 of motor 3a to atmosphere via chamber 12, bore 19, past the open valve 15, chamber 14 and passage 20 in said relay valve device for releasing the fluid under pressure therefrom.

Fluid under pressure supplied to pipe 50a will flow to chamber 30 in the interlock valve device 9a, past the open valve 31 to chamber 34 therein and thence through pipe 49a to chamber 7 in the motor 3a. With chamber 6 at the opposite side of piston 6 in motor 3a open to atmosphere through the relay valve device 8a the pressure of fluid now effective in chamber 7 will actuate said piston to move the clutch control lever 1a to its clutch engaged position, designated by numeral 2a. As a consequence of this movement of the clutch control lever 1a the supply control valve 31 will seat and the release valve 36 open in the interlock valve device 9 thereby opening pipe 49 and pressure chamber 7 in motor 3 to atmosphere past said release valve while closing communication between pipes 49 and 50.

To move the clutch control lever 1a back to its clutch disengaged position, without change in position of the clutch lever 1, the operator's control lever 55 need only be returned to the position in which it is shown in the drawing as will be apparent from previous description. It will also be apparent from the above description that the clutch control lever 1 may be moved to its engaged position, designated by numeral 2, and returned to its disengaged position in which it is shown in the drawing, without change in position of the clutch control lever 1a, by moving the operator's control lever to, respectively, the end 57 of slot 54 and returning it to the position in which it is shown in the drawing.

Now let it be assumed that with the operator's lever 55 in the position 56 in slot 54, causing the clutch control lever 1a to be in its clutch engaged position, designated by numeral 2a, the operator desires to move said clutch control lever 1a to its disengaged position and as quickly as possible move the other clutch control lever 1 to its engaged position. To accomplish this he will move his control lever from the position 56 in slot 54 directly to position 57 in said slot, due to which, pipe 50a will be opened to atmosphere, along with pipe 51, while fluid under pressure will now be supplied to pipe 50 thence to the lower end of the double check valve 52 in the double check valve device 10 and also to chamber 30 in the interlock valve device 9. With the clutch control lever 1a in its engaged position at the instant, the supply control valve 31 in the interlock valve device 9 will be closed to prevent flow of fluid under pressure from chamber 30, while pipe 49 will be still open to atmosphere past the respective release valve 36. Fluid under pressure supplied via pipe 50 to the lower end of the respective double check valve 52 will however shift it to its upper position, since pipe 51 is now vented, and thence flow via pipe 29a to diaphragm chamber 28 in the relay valve device 8a and actuate said device to supply fluid under pressure from the supply pipe 18 to chamber 6 in the motor 3a. Coincident with this supplying of fluid under pressure to chamber 6 in motor 3a, the opening of pipe 50a to atmosphere will result in release of fluid under pressure from chamber 7 in motor 3a past the now open supply control valve 31 in the interlock valve device 9a and also release of fluid under pressure from chamber 28 in the relay valve device 8 and operation thereof to open chamber 6 in motor 3 to atmosphere via chamber 12, bore 19, past the unseated valve 15, chamber 14 and passage 20 in said relay valve device for releasing fluid under pressure from said chamber, it being noted that chamber 7 in said motor will be still open to atmosphere past the unseated release valve in the interlock valve device 9. With chamber 7 in the motor 3a vented through the interlock valve device 9a and the operator's control valve device and with fluid under pressure supplied to chamber 6 in said motor, piston 4 in said motor will move the clutch control lever 1a to its disengaged position. As the lever 1a moves into its disengaged position the supply control valve 31 in the interlock valve device 9 will be opened whereupon fluid under pressure present in the respective chamber 30 from the operator's control device will become effective through pipe 49 in chamber 7 of motor 3. With chamber 6 in motor 3 vented, the pressure of fluid thus provided in chamber 7 will actuate the respective piston 4 to move the clutch control lever to its engaged position. As the clutch control lever 1 moves out of its disengaged position the supply control valve 31 will close and the release valve 36 open in the interlock valve device 9a for maintaining chamber 7 in motor 3a open to atmosphere until the motor 3 is subsequently operated to return the clutch control lever 1 to its disengaged position.

From the above description it will be seen that when the clutch control lever 1a is in its engaged position 2a with the operator's control lever 55 in position 56 in slot 54, if the operator desires to effect movement of the clutch control lever 1a to its clutch disengaged position and as quickly as possible, movement of the clutch control lever 1 to its engaged position he will move lever 55 from position 56 to position 57, but fluid under pressure will not be supplied to chamber 7 in motor 3 to move clutch control lever 1 to its engaged position until after the clutch control lever 1a obtains its disengaged position. Conversely, in a manner which will be apparent from the above description, the interlock valve device 9a, as controlled by motor 3, will prevent operation of motor 3a to move the clutch control lever 1a to its clutch engaging position, designated by reference numeral 2a, prior to movement of the clutch control lever 1 to its disengaged position in which it is shown in the drawing.

*Summary*

From the above description it will now be seen that I have provided an apparatus for selectively rendering either one of a plurality of releasable coupling means or clutches either effective or ineffective to transmit power from an engine or the like to a load to be driven, and embodying means for preventing either clutch becoming effective until after the other is rendered ineffective.

Having now described my invention, what I claim as new and desire to secure by Letters Patent, is:

1. An apparatus for selectively positioning each of two individual elements each having a first position and a second position, comprising in combination with said elements, control means arranged for connection with said elements for selectively controlling movement of said elements to their different positions, and interlock means controlled by said elements for breaking the connection between said control means and elements in their first position and for establishing such connection in their second position.

2. An apparatus for selectively positioning each of two individual control elements each having a first position and a second position comprising in combination with said elements, motor means for each of said elements operable by fluid under pressure to move the respective element to its first position, means for effecting movement of each of said elements to its second position upon release of fluid under pressure from the respective motor means, control means for selectively supplying fluid under pressure to actuate either of said motor means while releasing fluid under pressure from the other motor means, and interlock means operable in accordance with operation of said motor means for closing the fluid pressure supply communication to each of said motor means except with the control element of the other motor means in its second position.

3. An apparatus for selectively positioning each of two individual control elements each having a first position and a second position comprising in combination with said elements, a motor means for each of said elements responsive to fluid under pressure acting in one chamber upon release of fluid under pressure from a second chamber to move the respective element to its first position and responsive to fluid under pressure acting in said second chamber upon release of fluid under pressure from said one chamber to move the respective element to its second position, means including a control valve device for selectively providing fluid under pressure for supply to said first chamber in either one of the two motor means and to said second chamber in the other motor means while effecting a release of fluid under pressure from said second and first chambers in, respectively, said one and other motor means, and valve means controlled by said motor means for closing the fluid pressure supply communication to said first chamber in either motor means except with the control element of the motor means in its second position.

4. An apparatus for selectively positioning each of two individual control elements each having a first position and a second position comprising in combination with said elements, a motor means for each of said elements responsive to fluid under pressure acting in one chamber upon release of fluid under pressure from a second chamber to move the respective element to its first position and responsive to fluid under pressure acting in said second chamber upon release of fluid under pressure from said one chamber to move the respective element to its second position, means including a control valve device having a first position for supplying fluid under pressure to said first chamber in one of said motor means and to said second chamber in the other motor means while establishing a fluid pressure release communication to said second and first chambers in respectively said one and other motor means and having a second position for supplying fluid under pressure to said first and second chambers, respectively, in said other and one motor means while establishing a fluid pressure release communication to said first and second chambers, respectively, in said one and other motor means, and interlock means controlled by each motor means for closing the fluid pressure supply communication from said control valve device to said first chamber in the other motor means except with the control element of the respective motor means in its second position.

5. An apparatus for selectively positioning each of two individual control elements each having a first position and a second position comprising in combination with said elements, a motor means for each of said elements responsive to fluid under pressure acting in one chamber upon release of fluid under pressure from a second chamber to move the respective element to its first position and responsive to fluid under pressure acting in said second chamber upon release of fluid under pressure from said one chamber to move the respective element to its second position, means including a control valve device having a first position for supplying fluid under pressure to said first chamber in one of said motor means and to said second chamber in the other motor means while establishing a fluid pressure release communication to said second and first chambers in, respectively, said one and other motor means, and having a second position for supplying fluid under pressure to said first and second chambers, respectively, in said other and one motor means while establishing a fluid pressure release communication to said first and second chambers, respectively, in said one and other motor means, and interlock means controlled by each motor means for closing the fluid pressure supply communication from said control valve device to said first chamber in the other motor means except with the control element of the respective motor means in its second position, said control valve device having a third position for effecting supply of fluid under pressure to said second chamber in both of said motor means while opening a fluid pressure release communication from said first chamber in both of said motor means.

6. An apparatus for selectively positioning each of two individual control elements each having a first position and a second position comprising in combination with said elements, a motor means for each of said elements responsive to fluid under pressure acting in one chamber upon release of fluid under pressure from a second chamber to move the respective element to its first position and responsive to fluid under pressure acting in said second chamber upon release of fluid under pressure from said one chamber to move the respective element to its second position, first and second pipes for conveying fluid under pressure to and from said first chamber in, respectively, said first and second motor means, means including third and fourth pipes for supplying fluid under pressure to and for releasing fluid under pressure from said second chamber in said first and second motor means, respectively, a fifth pipe, a double check valve subject opposingly to pressures of fluid in said first and fifth pipes controlling communication therebetween and said third pipe, another double check valve subject opposingly to pressures of fluid in said second and fifth pipes controlling communication therebetween and said fourth pipe, an interlock valve device operable by said first motor except in the second position of the respective control element to close communication from said second pipe to said second motor, an interlock valve device operable by said second motor except in the second position of the respective control element to close communication from said first pipe to said first motor, and an operator's control valve device for selectively supplying fluid under pressure to either one of said first and second pipes while venting the other and said fifth pipe and for supplying fluid under pressure to said fifth pipe while venting said first and second pipes.

HOWARD C. ROWAND.

REFERENCES CITED

The following references are of record in the file of this patent:

UNITED STATES PATENTS

| Number | Name | Date |
| --- | --- | --- |
| 1,488,736 | Conradson | Apr. 1, 1924 |
| 2,180,154 | Lenz | Nov. 14, 1939 |
| 2,286,873 | Schwartz | June 16, 1942 |
| 2,464,986 | Miller | Mar. 22, 1949 |

OTHER REFERENCES

Serial No. 400,817, Maybach (A. P. C.), published May 18, 1943.